Oct. 28, 1952

A. G. F. WALLGREN 2,615,767

DOUBLE ROW ROLLER BEARING

Filed June 11, 1947

Patented Oct. 28, 1952

2,615,767

UNITED STATES PATENT OFFICE 2,615,767

DOUBLE ROW ROLLER BEARING

August Gunnar Ferdinand Wallgren, Stockholm, Sweden

Application June 11, 1947, Serial No. 753,959
In Sweden June 14, 1946

1 Claim. (Cl. 308—214)

My invention relates to double row roller bearings comprising two rows of rollers disposed between outer and inner bearing members, said rollers being of conical or substantially conical shape. The rollers are axially fixed in both directions between raceways on the bearing members and guide surfaces supporting the one end surface of the rollers. In this form of bearings the rollers cannot be assembled, unless the bearing members are arranged eccentrically relative to each other, while the outer bearing member is subjected to an elastic deformation, as described more fully in my copending patent application Ser. No. 666,373, filed May 1, 1946.

It is the object of the invention to increase the number of rollers that can be inserted between the bearing members, a matter which is of value in certain special cases, as in small bearings having a great axial width, or where the rollers are to be set at a great angle of inclination to the bearing axis, for the purpose of attaining a great axial thrust capacity.

Figure 1:
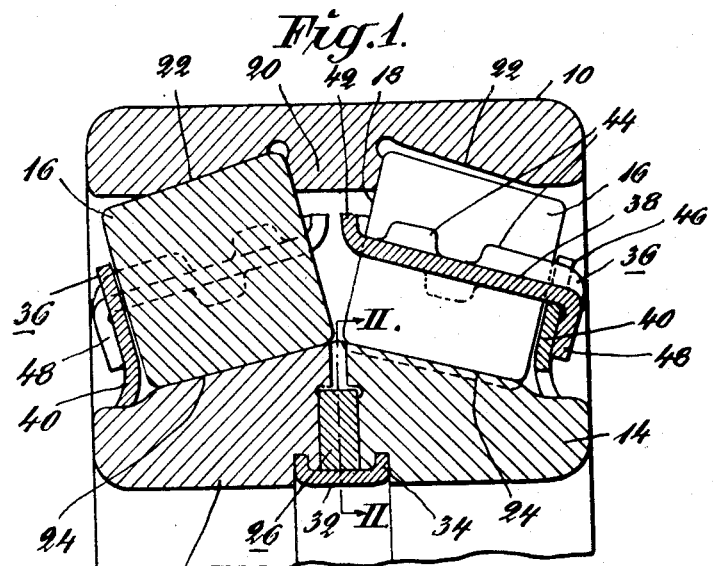
Figure 2:
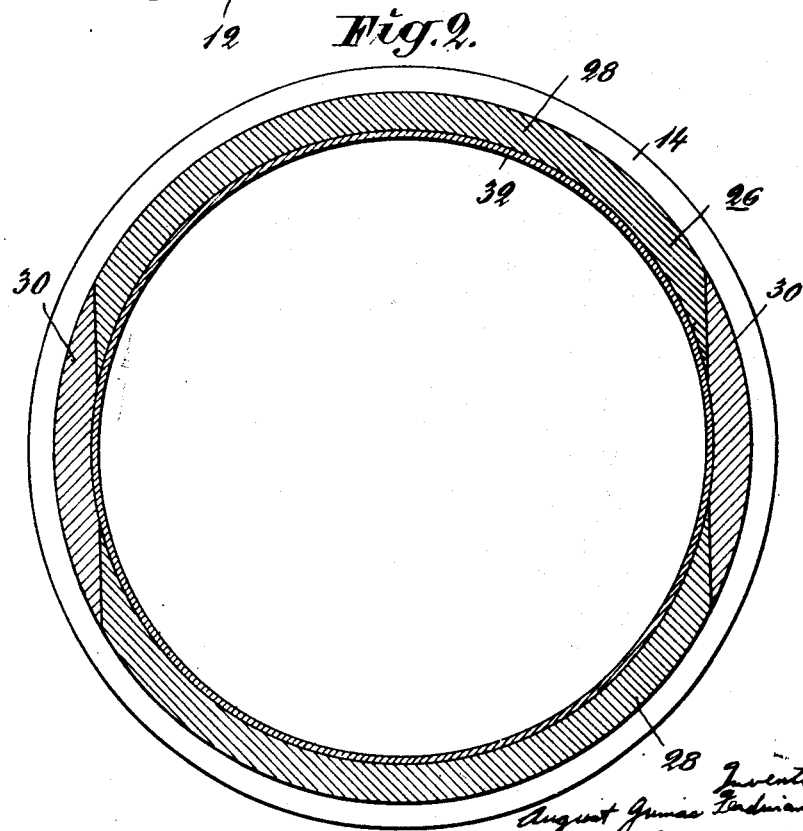

Further objects and advantages of the invention will be apparent from the following description considered in connection with the accompanying drawing which forms a part of this specification, and of which:

Fig. 1 is a longitudinal sectional view of a portion of a bearing constructed according to the invention, and Fig. 2 a sectional view taken on the line II—II of Fig. 1.

In the drawing, 10 designates the outer ring member of the bearing and 12, 14 the inner ring member of the bearing, which is divided into two parts in planes at right angles to the axis of the bearing. Inserted between the rings are conical rollers 16 abutting with their inner end surfaces 18, which are preferably of a slightly convex spherical configuration in a known manner, against a central annular flange 20 in the outer ring 10. The latter has two raceways 22 of a conical or approximately conical shape, the diameter of which grows in a direction toward the centre of the outer ring. Likewise, the two parts 12 and 14 of the inner ring each have a conical or approximately conical raceway 24, the diameter of which increases in a direction toward the centre of the bearing. The raceways 22 and 24 for a row of rollers converge, like the conical surface of the rollers, in a manner so as to form a portion of the mantle surface of cones, the apexes of which meet at a common point on the bearing axis, which point is situated on the same side of the centre of the bearing as the row of rollers under consideration. The position of the rollers 16 is axially fixed in both directions as a result of such form of the raceways and by the presence of the central guide flange 20.

The two ring elements 12 and 14 of the inner ring are maintained in the finished bearing in spaced relation with the aid of a spacing ring, generally designated by 26, which in the present case is composed of four parts of such configuration as to permit of being introduced between the ring elements from the inside thereof. To this end, the spacing ring 26 may consist of two arcuate members 28 having their greatest extent at right angles to the bearing axis, which is somewhat smaller than the inner diameter of the ring elements and of smaller segment-shaped members 30 placed between the members 28. To keep the members of the spacing ring in position, there is provided a closed ring 32 on the inside of the same, the lateral edges 34 of such ring being bent at right angles and rolled into corresponding grooves in the ring elements 12 and 14. It will be readily understood that the ring 32 need not take up any axial pressure acting upon the bearing upon the operation thereof.

The rollers 16 are maintained in the desired relative position with the aid of a roller cage for each of them, such cage being generally denoted by 36. Each roller cage comprises supporting members 38 introduced between the rollers, and an integral ring 40 extending about the circumference of the bearing. The supporting members 38 may be provided, at the end thereof facing the centre of the bearing, with a collar or enlarged portion 42 of a greater width than that of the portion of the supporting members situated between two rollers. Such portion will thus bear against the inner end surfaces 18 of the rollers. To increase the contact surfaces between the supporting members 38 made from sheet-metal and the rollers 16, the former may have bent flaps 44 adapted to the shape of the rollers. Obviously, a supporting member constructed in this way cannot be inserted between two rollers, unless the latter are temporarily separated from each other, until the part 42 has been brought into position behind the rollers. After the supporting members have been introduced between the rollers, they are united with the lateral ring 40, for instance by being provided with recesses 46 fitting to the supporting members, so that the end portions 48 of the latter may be folded down about the lateral ring 40 and connected thereto by point welding. Inasmuch as supporting members 38 having a collar portion 42 cannot be introduced into the last space between the two rollers 16, after the other roller spaces have been occupied by supporting members, at least one of such supporting members is without a collar portion. With respect to the shape of the roller cages 36 in this particular example, reference is made to my copending patent application Ser. No. 717,058 now Patent No. 2,489,342 granted November 29, 1949.

In the assembly of the bearing, the two elements of the inner ring are brought into contact with each other and into an eccentrical position relative to the outer ring 10. This causes the radial distance between the raceways to become greater than in the finished bearing, by reason of which the outer ring 10 need not be subjected to any exaggerated elastic deformation to bring in the desired number of rollers. A greater number of rollers may be inserted between the bearing rings than if the inner ring were made integral. Upon the completion of this operation the spacing ring 26 is mounted and the cage ring 32 rolled to final shape. After that, the supporting members 38 of the roller cages 36 are introduced between the rollers 16 and, finally, the supporting members are united with the lateral rings 40.

While one more or less specific embodiment of the invention has been shown, it is to be understood that this is for purpose of illustration only, and that the invention is not to be limited thereby, but its scope is to be determined by the appended claim.

What I claim is:

A double row roller bearing comprising inner and outer bearing ring members and rollers arranged therebetween, said rollers being tapered and having their large ends disposed in close proximity to each other and with the radially innermost portions of said large ends in slightly spaced relation, said ring members being provided with tapered raceways parallel with the surfaces of the rollers, the outer ring member having surfaces engaged by said larger ends of the rollers for limiting axial movement of the rollers toward each other and the raceways of the inner ring member limiting axial movement of the rollers away from each other, said inner ring member being centrally divided in a plane normal to the axis of the member to provide two inner rings each having thereon the inner raceway for one of the rows of rollers, a spacing member located between said rings for locating the rings axially with respect to each other, said spacing member being radially spaced inwardly of said inner raceways and the inner ends of said inner raceways and the adjacent inner ends of said rollers axially overlapping said spacing member, and means for holding said inner rings and said spacing member in axially assembled relation.

AUGUST GUNNAR
FERDINAND WALLGREN.

REFERENCES CITED

The following references are of record in the file of this patent:

UNITED STATES PATENTS

| Number | Name | Date |
|---|---|---|
| 1,379,945 | Teetson | May 31, 1921 |
| 1,411,837 | Boulissiere | Apr. 4, 1922 |
| 1,439,901 | Knowles | Dec. 26, 1922 |
| 1,982,899 | Buckwalter | Dec. 4, 1934 |
| 2,128,668 | Baker | Aug. 30, 1938 |